April 10, 1962     I. L. JOY     3,028,753
APPARATUS FOR WETTING SURFACES FOR ULTRASONIC TESTING
Filed July 13, 1959     4 Sheets-Sheet 1
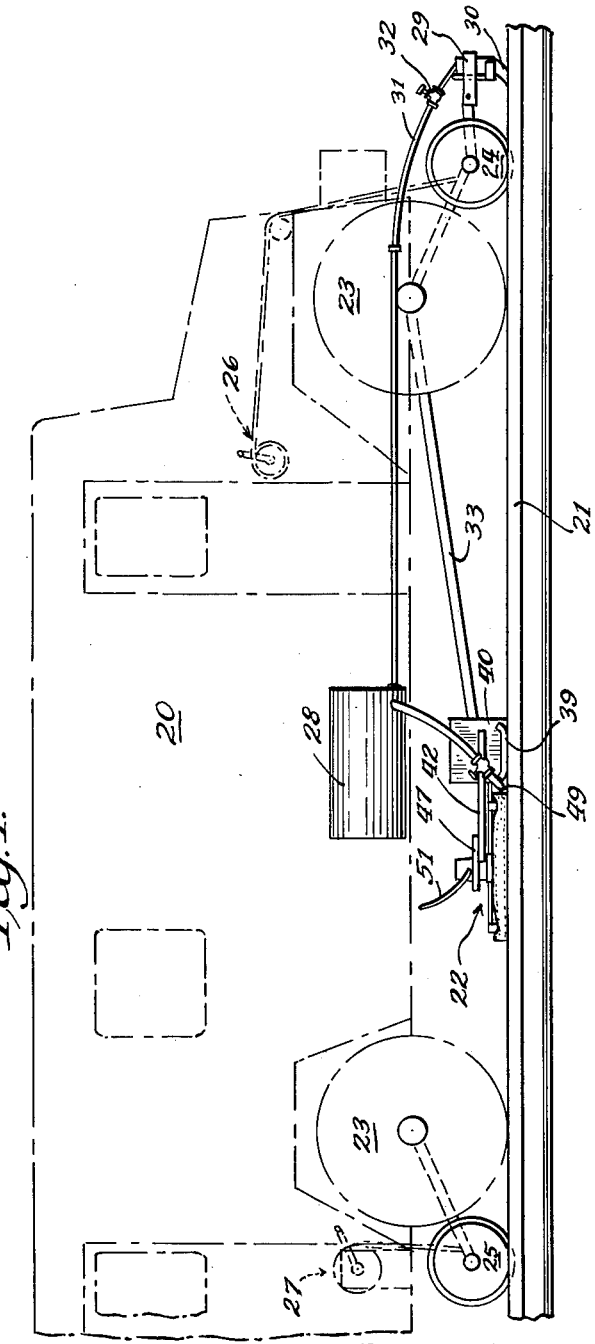
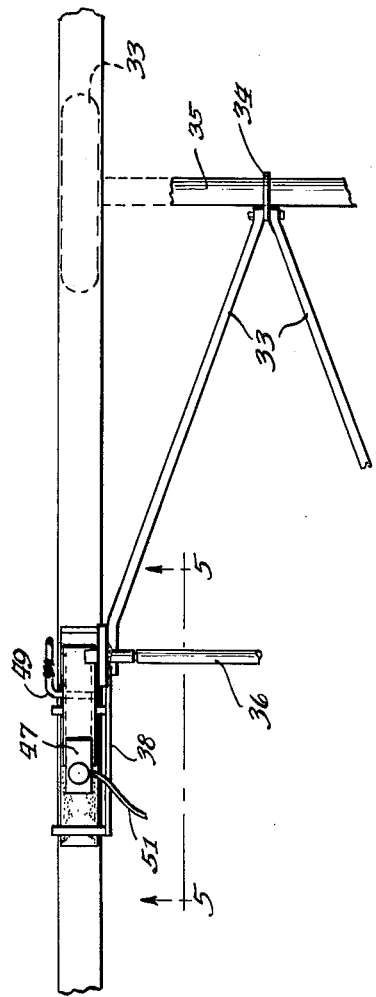
Inventor
Ivan L. Joy
By Mann, Brown and Hauemann
Attys.

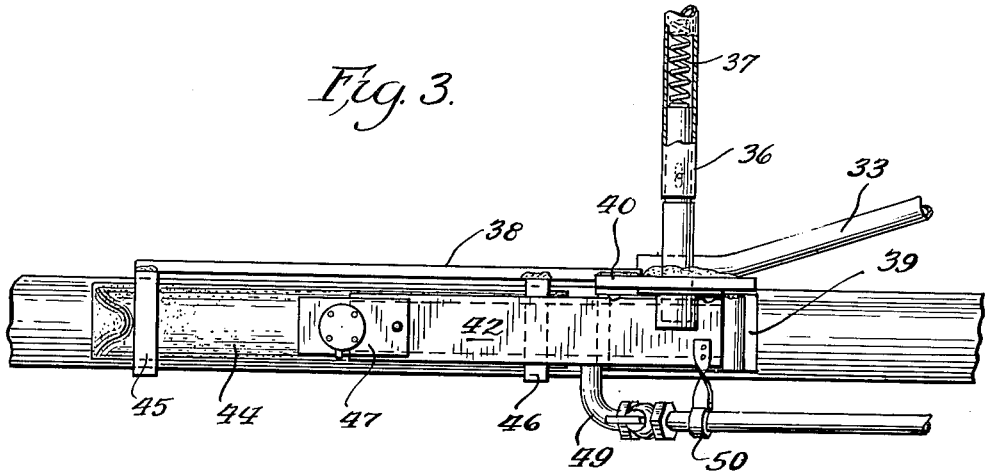
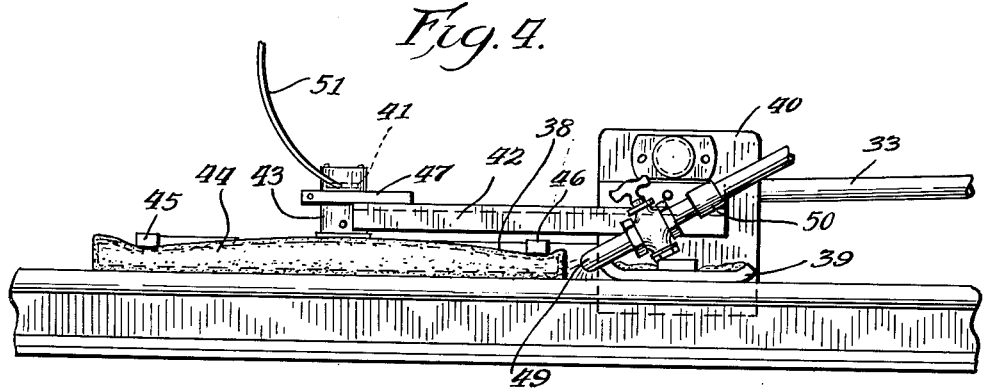
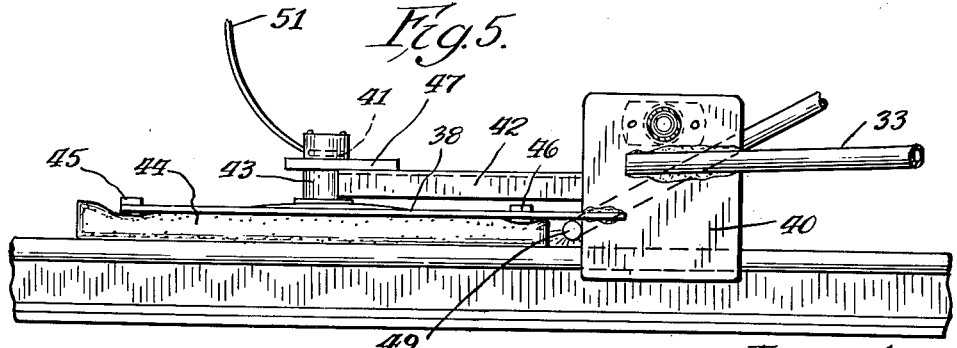

April 10, 1962     I. L. JOY     3,028,753
APPARATUS FOR WETTING SURFACES FOR ULTRASONIC TESTING
Filed July 13, 1959     4 Sheets-Sheet 3

Inventor
Ivan L. Joy.
By Mann, Brown & McWilliams.
Attys.

April 10, 1962     I. L. JOY     3,028,753
APPARATUS FOR WETTING SURFACES FOR ULTRASONIC TESTING
Filed July 13, 1959     4 Sheets-Sheet 4
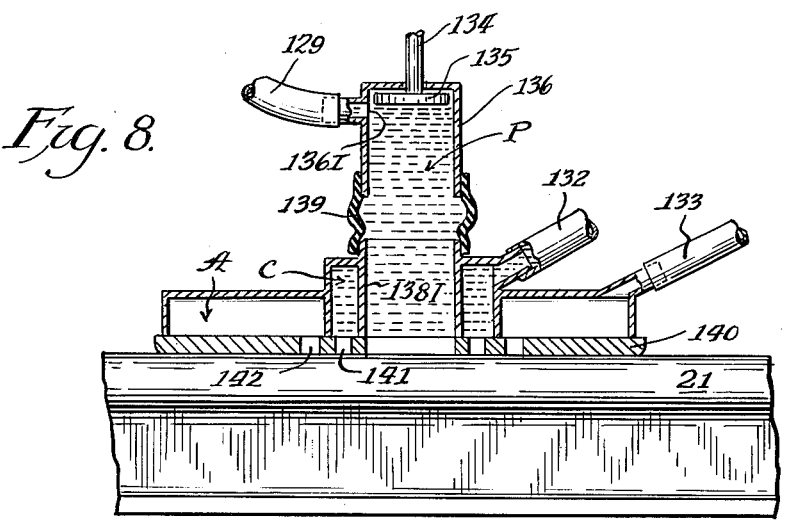
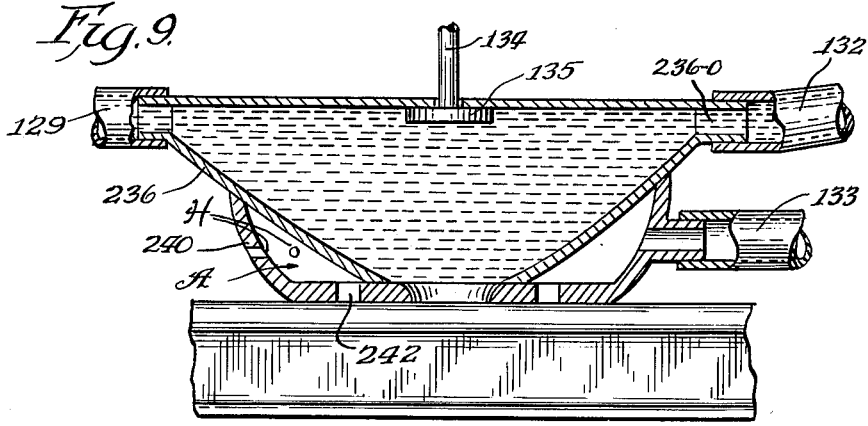
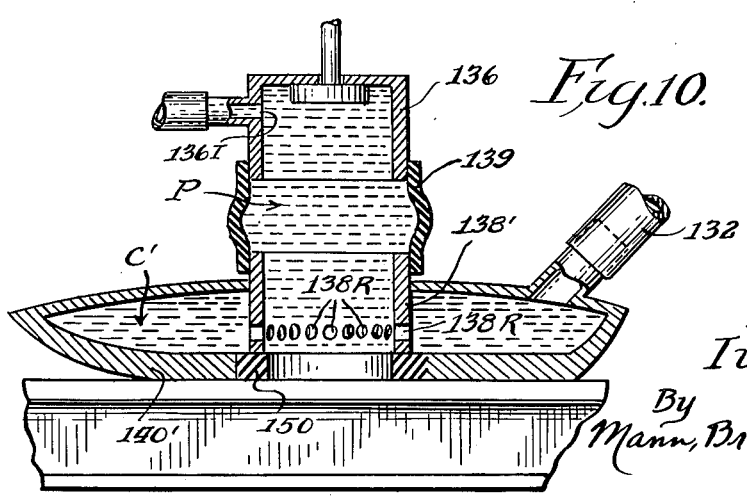
Inventor
Ivan L. Joy
By Mann, Brown & McWilliams,
Attys.

United States Patent Office 3,028,753
Patented Apr. 10, 1962

3,028,753
APPARATUS FOR WETTING SURFACES FOR
ULTRASONIC TESTING
Ivan L. Joy, 1616 W. Dudley Road, Topeka, Kans.
Filed July 13, 1959, Ser. No. 827,675
12 Claims. (Cl. 73—67.8)

This application is filed as a continuation-in-part of my copending application, Serial No. 539,129, filed October 7, 1955, and now abandoned, the disclosure of which is hereby specifically incorporated by reference.

This invention relates to means for wetting the surface of a body under test for obtaining maximum coupling efficiency in the transmission of elastic waves into the body and is particularly useful in systems for the continuous progressive testing of rail with ultrasonics.

In the usual ultrasonic rail testing arrangement, a suitable detector car progresses a crystal transducer over successive rail portions at a substantial speed and the relative movement between the transducer and the rail aggravates the problem of securing adequate coupling for the transmission of elastic vibrations therebetween.

A variety of arrangements for solving this problem are known. One solution is to maintain a stream of liquid couplant between the crystal and the rail. Another solution is to progress a static column of coupling liquid over the rail surface while maintaining the crystal in contact with the static column. Still another solution is to encase the crystal in a liquid filled container having a suitable diaphragm contacting the rail. Here also a jet of water is employed between the diaphragm and the rail surface.

While each of the above solutions offer their own particular advantages and disadvantages, it is the principal object of the present invention to provide a means for improving the coupling efficiency of any or all of the above arrangements and any similar arrangements wherein a coupling liquid is applied to the surface of the body under test for facilitating the transmission of elastic vibrations thereinto.

Another object is to provide an elastic wave transmitting device for the ultrasonic testing of rail having a novel arrangement for supplying liquid couplant between the contacting surfaces of the transmitting device and the rail under test.

Still another object is to provide an improved liquid coupling arrangement for use in continuous progressive ultrasonic testing of rail, the arrangement utilizing a dispensing and reclaiming coupling system that maintains a water column between the ultrasonic emitter and the rail and that includes a liquid-reclaiming suction line for collecting and recirculating the coupling water in combination with a prewetting system that applies a film of water to the rail to be tested to increase the efficiency of ultrasonic transmission between the emitter and rail, with the water film serving to seal the region between the rail and the coupling system for preventing entry of bubbles into the water column and for improving the efficiency of the reclaiming circuit.

Other objects and advantages of the invention will be apparent during the course of the following description.

In the accompanying drawings forming a part of this specification and in which like numerals are employed to designate like parts throughout the same, FIG. 1 is a side elevational view of a detector car having the novel coupling liquid means of the present invention;

FIGS. 2 and 3 are fragmentary plan views illustrating the arrangement for suspending from a detector car an elastic wave transmitting apparatus having a coupling liquid system in accordance with the present invention;

FIG. 4 illustrates the apparatus of FIGS. 2 and 3 as viewed from the field edge of the rail;

FIG. 5 illustrates the apparatus of FIGS. 2 and 3 as viewed from the gauge edge of the rail;

FIGS. 8, 9 and 10 are longitudinal sectional views through three additional alternative forms of ultrasonic coupling apparatus used on the car of FIG. 6.

Figure 6:
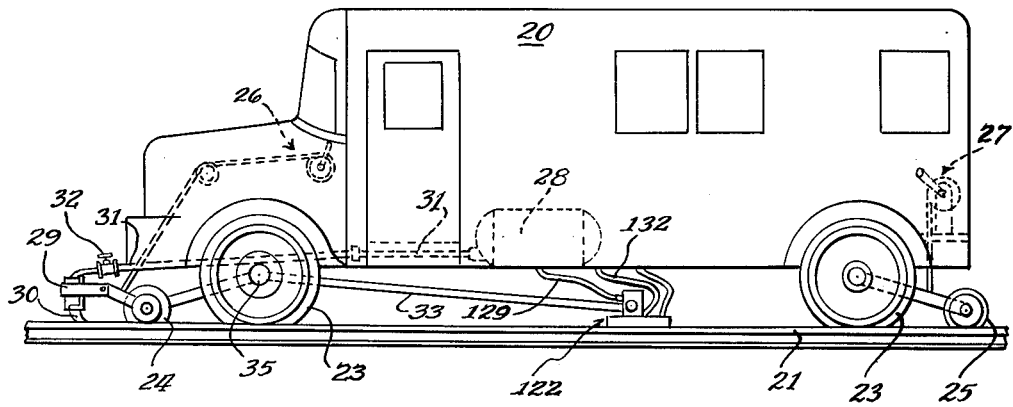
FIG. 6 is a side elevational view of an ultrasonic rail detector car having a water dispensing and reclaiming coupling system in combination with a water prewetting arrangement.

The present invention teaches that prewetting a surface that is to be subjected to elastic waves with a suitable coupling liquid greatly enhances the coupling efficiency and facilitates the transmission of the elastic waves through the surface. This prewetting concept is not intended to replace the known arrangements for coupling elastic waves into a body but it does augment such arrangements in that it renders the coupling liquids used therein far more effective. The apparent explanation for the unusual advantages accruing from this prewetting is that it takes a finite amount of time for the coupling liquid to absorb into the surface of the body under test and set up the proper degree of wetness.

In most stationary testing applications, there is usually adequate time for the coupling liquid to properly wet the surface of the body under test and in such cases contact is not materially improved by prewetting the test surface. However, in applications wherein the crystal and the test surface are only momentarily in working relationship, prewetting serves an important function.

Presumably the wetting which is accomplished right at the crystal in any of the momentary arrangements does not have sufficient time to establish effective contact and when normal wetting procedures are used in conjunction with prewetting, significant improvements in the efficiency of coupling become apparent.

Referring now to the drawings and particularly to FIG. 1, one constructional embodiment of this prewetting concept is shown applied to a detector car 20 that is adapted to ride over a rail 21 and to support an elastic wave transmitting apparatus 22 for coupling contact with the rail 21. The detector car illustrated is actually a truck having conventional rubber tires 23 for highway travel. The car is also adapted to travel over rails and for this purpose is provided with front and rear flanged wheels 24 and 25, respectively. When travelling on the highway, the flanged wheels 24 and 25 are held in elevated relationship by suitable hand-pulley arrangements 26 and 27, respectively. When travelling on the railroad tracks, the tires support the weight of the car and the flanged wheels serve to maintain the car on the rails. It should be apparent, however, that any desired type of detector car may also be employed.

The car 20 is provided with a water reservoir 28 for supplying coupling liquid to the elastic wave transmitting apparatus 22 and at its front end is provided with a pair of pipes 29 that carry a dispenser in the form of a sponge 30 of absorbent material in wiping contact with the surface of each rail. The sponges 30 are also connected to the water reservoir 28 by suitable flexible tubing 31 for supplying water to the sponges and thereby applying a thin film of coupling liquid to the rail. A manually controlled valve 32 controls the supply of water to the sponges and due to the regulating action of the sponge, it is possible to maintain the water reservoir 28 in continuous communication with the sponges without creating an excessive amount of water consumption.

It will be noted that the elastic wave transmitting device 22 is mounted on the car at a point substantially rearwardly of the mounting location of the sponges 30 so that an appreciable interval of time elapses between the prewetting operation as carried out by the sponges and the actual detecting operation as carried out by the elastic wave transmitting device 22. More specifically, in one constructional form this spacing is approximately eight feet so that with a detector car travelling at eight miles per hour there is an elapsed time of two-thirds of a second. This time interval is sufficient to permit the prewetting film of water to be absorbed by the material at the surface of the rail so that the actual coupling device produces a more perfect contact for transmitting elastic waves into the rail.

For maximizing the prewetting time, it is preferred that the prewetting sponges be located forwardly of the front tires 23 and front flanging wheels 24; and while these wheels must pass over the prewetted rail portions before they are subjected to the testing device, it has been found in practice that this arrangement does not adversely affect the desired prewetting action, but in fact the weight of the wheels easily overcomes the surface tension of the film and forces the prewetting film onto the surface roughness of the rail.

A single sending and receiving crystal 41 is shown and it is driven by electrical signals delivered from any suitable ultrasonic system (not shown) by means of the wires 51. The invention is, of course, applicable in cases where separate sending and receiving crystals are used.

As mentioned previously, the prewetting concept improves the coupling efficiency of any of the known coupling arrangements used in the ultrasonic testing of rail and this includes: dispensing devices employing a stream of liquid couplant between the crystal and the rail, dispensing devices for progressing a static column of coupling liquid over the rail surface, and devices wherein the crystal is encased within a liquid filled container having a diaphragm in coupling contact with the rail surface through the medium of a dispenser that emits a jet of water.

This last mentioned arrangement is illustrated herein in connection with a novel means for establishing effective coupling by means of a jet of water which is applied between the contacting surfaces of the diaphragm and the rail.

In this specific form, the elastic wave transmitting device is suspended from the detector car frame so that it rides upon the rail and follows the varying contours of the rail surface. There is one such device for each rail and they are shown in FIGS. 2 and 3.

The suspension system is best shown in FIGS. 2 and 3 and includes a pair of rearwardly diverging members 33 supported from a common member 34 for pivotal movement about the front axle 35 of the detector car. The opposite ends of the diverging members 33 are rigid with the remote ends of a telescoping bar arrangement 36 which normally tends to expand in order to urge the elastic wave transmitting devices 22 into lateral engagement with the rail. An internal spring 37 provides this expansion of the telescoping bars.

Each elastic wave transmitting device comprises an elongated main frame member 38 that rigidly supports a horizontally disposed rail shoe 39 for engagement with the top surface of the rail 21 and a vertically disposed flange shoe 40 for engagement with the gauge surface of the rail. The flange shoe 40 receives both the support member 33 and the associated telescoping bar. It will be seen that the transversely arranged telescoping bars urge the elastic wave transmitting devices outwardly to positions directly over the rail and this outward movement is limited by the engagement of the flange shoes 40 with the rail edges.

The transmitting device itself is also mounted on the main frame member 38 and includes a crystal 41 immersed in a column of coupling liquid that is confined within an upper chamber 43 that is supported by an arm 42 suitably attached to the flange shoe and extending rearwardly thereof. The upper chamber is in open communication with an elongated lower chamber 44 that may be formed of a section of a rubber inner tube sealed at its ends by clamping members 45 and 46 carried by the main frame member 38. The lower chamber 44 is necessarily filled with coupling liquid. The crystal mounting portion is secured to the arm 42 by a mounting plate 47. Provision for adjusting the orientation of the crystal relative to the rail surface may be incorporated into the device as desired.

According to the present invention, a jet of water is provided between the elongated lower chamber 44 and the rail surface by locating a water supply or dispensing pipe 49 rearwardly of the rail shoe 39 and forwardly of the elongated rubber diaphragm or coupling shoe 44. The water supply pipe 49 is fed from the water reservoir carried by the car and is preferably rigid with the structural frame work of the transmitting device as indicated by the bracket 50. The specific location of this pipe between the rail shoe and the coupling shoe is quite important to the attainment of efficient coupling. It will be noted that the rail shoe passes over the prewetted rail portions before the actual coupling device, but it does not in any way disturb the coupling action that is set up by the prewetting solution. However, when the jet of water is also located forwardly of the rail shoe, the wiping action of the rail shoe prevents the establishment of proper coupling between the coupling shoe and the rail surface.

The specific coupling device and wetting arrangement illustrated herein achieves a maximum of coupling efficiency both by reason of the arrangement for providing prewetting of the surfaces to be tested and also by reason of the strategic location of the water jet. The use of a crystal enclosed in a container reduces water consumption significantly as does the application of the prewetting principle and the strategic location of the water jet.

In FIG. 6, the invention is illustrated in an alternative form as applied to a detector car of generally similar construction, and corresponding parts of the cars of FIGS. 1 and 6 have been assigned identical reference characters. The prewetting system may be of substantially the same construction, and again a sponge is shown at 30, though a wiping rag or light jet spray might also be employed. The ultrasonic coupling apparatus is shown at 122, and it is suspended from a similar carriage arrangement and is supplied from a water reservoir 28 over the line 129. The coupling apparatus 122 is of a liquid dispensing and reclaiming type and may take a number of different specific forms such as are shown in FIGS. 7, 8, 9 and 10. However, in each of these forms, a solid stream of coupling liquid continuously flows through and fills the space between the ultrasonic emitter and the rail, and this stream is continuously reclaimed through line 132 and returned to the water reservoir 28. Preferably, the liquid is filtered and cleaned of any entrapped gas bubbles and dirt or grease. A suitable apparatus for this purpose is shown in my copending application, Serial No. 654,941, filed April 24, 1957, the disclosure of which, to the extent it is not inconsistent herewith, is specifically incorporated by reference.

Experience has shown that a unique cooperation exists when the prewetting unit of this disclosure is combined with a coupling apparatus of the type that employs a continuous flow stream which is reclaimed, cleaned and recirculated. The presence of the prewetting film of water on the rail for a finite time interval prior to the passage of the main coupling apparatus 122 is again importantly effective to improve the efficiency of coupling of the ultrasound between the emitter and the rail but, in addition, this film of liquid acts as a hydraulic seal which prevents air bubbles from entering the main flow stream of coupling liquid and which enhances the seal at the region of the rail to improve the reclaiming action of the water-recirculating system. Actual experience has shown that the use of prewetting, in addition to permitting higher testing speeds and in addition to permitting testing on dirty and rusty rail, when used in combination with a water-reclaiming system results in less water being lost than is the case with a reclaiming system that is used without prewetting. This is explainable because of the hydraulic seal that is established by the film of liquid.

Figures 7, 7A:
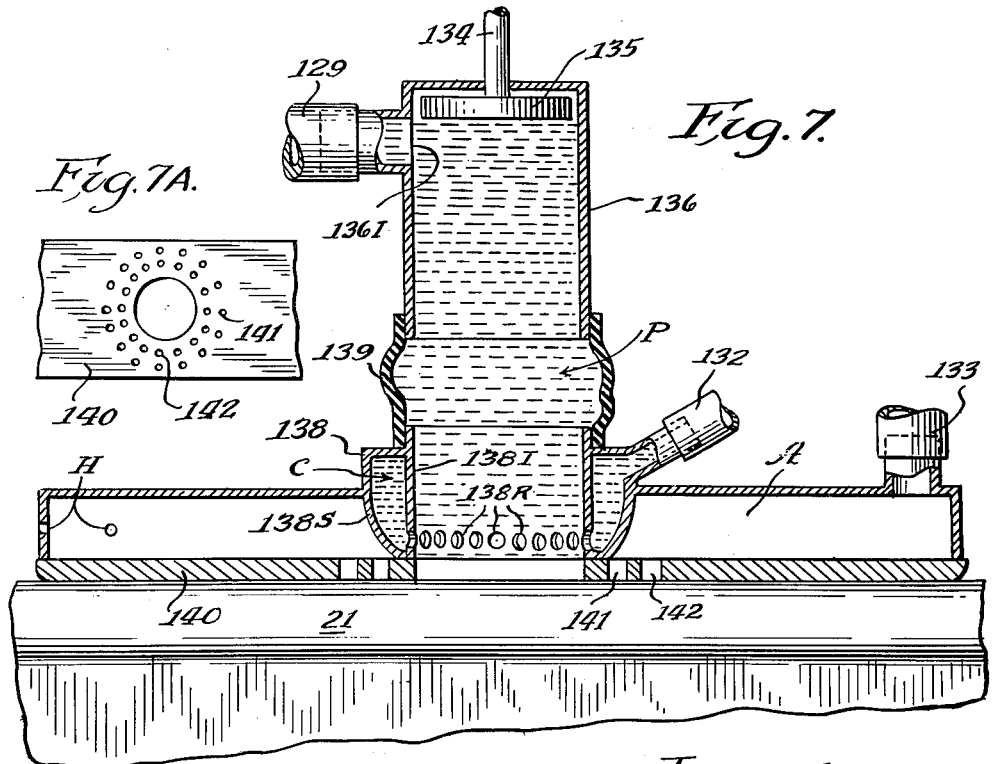
FIG. 7 is a longitudinal sectional view through one form of ultrasonic coupling apparatus used on the car of FIG. 6.
FIG. 7A is a bottom plan view of the rail shoe of the coupling apparatus of FIG. 7.

In the forms of the liquid dispensing type coupling apparatus illustrated in FIGS. 7 and 8 for purposes of disclosure, a solid flow stream is set up along a path extending from the emitter towards the rail surface so that the ultrasonic signals move downstream through the liquid path in travelling from the emitter to the rail surface and move upstream in returning from the rail surface towards the emitter. Also, for purposes of disclosure, the invention is described as applied to coupling ultrasonic signals through the top surface of the rail since this application involves a more severe gas-bubble problem, but it will be apparent that the principles are also applicable to the coupling of ultrasonic signals through the side surfaces of the rail.

The ultrasonic coupling apparatus illustrated generally at 122 in FIG. 6 is shown in more detail in FIGS. 7 and 7A and is arranged to develop a vertically downwardly directed flow stream through the space that exists between the facing surface of the rail 21 and the emitter 135 to provide a direct ultrasonic path therebetween. In FIG. 7, the emitter 135 is represented as a piezoelectric crystal that is actuated by high-frequency electrical signals supplied through a coaxial cable 134. The crystal 135 is mounted within the closed upper end of a rigid holder tube 136, with the tube having a coupling liquid inlet 136I located approximately at the elevation of the emitting face of the crystal and directing a stream of coupling liquid across this emitting face to continuously sweep it free of gas bubbles that may tend to collect there. After sweeping the face of the crystal, the incoming liquid flows vertically downwardly through the holder tube as a solid stream and at a rate sufficient to prevent gas bubbles from rising therein.

In the preferred arrangement for rail testing, the lower end of the holder tube terminates well above the rail surface and communicates with a rigid tube 138 through an intermediate section 139 of flexible tubing material, such as rubber, with the tube 138 being joined to an open-centered, rail-engaging shoe 140 to form a flow passage P extending the full distance between the facing surfaces of the rail and the emitter. The tube 138 is in the form of a chambered skirt assembly having an inner skirt 138I forming the lower portion of the coupling-liquid flow passage and a surrounding outer skirt 138S rigid with and spaced outwardly of the inner skirt to form therebetween an enclosed liquid-collecting chamber C that is connected to the liquid-suction line 132. In this preferred embodiment, the chamber C communicates with the flow passage P at a region slightly above the place thereof bounded by the rail surface, such communication being effected through a plurality of radially extending ports 138R provided in the inner skirt 138I. The bulk of the water, therefore, flows through these ports 138R to the chamber C for reclaiming in the coupling-liquid suction line 32; and experience indicates that the flow pattern of this device effectively maintains a continuous ultrasonic coupling path between the facing surfaces of the emitter and rail, even though relatively little water flows between the adjacent surfaces of the rail shoe and the rail.

The presence of the prewetting film of liquid on the rail is particularly important in the structure of FIG. 7 since the relatively small water flow between the adjacent surfaces of the rail shoe and the rail may not always exclude the entry of bubbles at the bottom of the passage P. The film ensures the presence of a substantially continuous hydraulic seal around the bottom of the passage P so that, in addition to its prewetting action, it prevents bubbles from entering the ultrasonic path.

In many instances the reclaiming action may operate so efficiently that the rail surface appears to be dry as far as the eye can tell. However, there remains a sufficient wetted condition produced by the application of the prewetting film to permit the solid stream of coupling liquid to establish an efficient ultrasonic coupling between the emitter and the rail. This condition is particularly noticeable when testing in the desert. However, it is usually impossible to test in the desert without utilizing prewetting. Thus, while the prewetting film aids the reclaiming system, this effect is not so pronounced that it can dry the rail to a condition where transmission of ultrasonic signals becomes impaired.

As indicated in FIG. 7, the shoe 140 is formed with a chamber A that surrounds the liquid-collecting chamber C and communicates with the flow passage P through inner and outer annular sets of ports 141 and 142, respectively, that open from the shoe chamber towards the surface of the rail. The shoe chamber A is connected to an air-suction line 133, and since relatively little water travels through this line and saturation is thereby avoided, the air therein may move very rapidly. Since the hydraulic seal afforded by the prewetting film continuously minimizes the amount of air drawn between the adjacent surfaces of the shoe and rail, it is advantageous to provide one or more bypass holes H to the vacuum chamber A to allow air to flow at a rate sufficient to develop an efficient air-sweeping action and minimize the residual film of liquid deposited on the rail surface. When the bypass hole is employed, less vacuum is required to sustain a given flow rate of air and water.

With the above-described arrangement, wherein the emitter is mounted over the top surface of the rail and a solid stream of water serves as the couplant and flows downwardly through the flow passage, the flow rate of such stream should be on the order of two feet per second in order to overcome the tendency of gas bubbles to move upwardly through the flow passage. In this way the bubbles are carried away and do not appear as "hash" in the reflected signals. Assuming a flow passage of one inch diameter, a flow rate of approximately five gallons per minute is required to maintain the desired stream velocity. Thus, the reclaiming system must be able to handle efficiently the collection, return, and cleansing of water at the rate of five gallons per minute, while continuously air-sweeping the rail surface to inhibit the deposit of a residual film of water thereon. The arrangement of FIG. 7 fulfills this need.

An alternative embodiment is shown in FIG. 8 wherein the water returned through the suction line 132 from the couplant chamber C flows around the lower end of the skirt 138I and upwardly through the inner annular set of holes 141 while only the outer set of holes 142 feeds the air-suction chamber A formed in the shoe 140. The construction is otherwise identical to that of FIG. 7.

With the arrangement of FIG. 8, the prewetting film is of principal value at the region between the ring of ports 141 and the ring of ports 142. The prewetting film forms a hydraulic seal at this point which substantially precludes entry of air into the water couplant chamber C and its suction line 132, and this minimizes entrapment of gas bubbles and therefore simplifies the filtering operation. The exclusion of air from chamber C by the hydraulic film also encourages an increased flow of air into the air suction chamber A and again produces an improved air-sweeping action on the rail.

It will be apparent to those skilled in this art that the double suction line arrangement of the invention, which utilizes one line primarily for air to develop a surface-sweeping action and produce an efficient pooling of coupling liquid and the other line primarily for liquid to maintain the desired flow rate, is applicable to coupling devices arranged to produce other flow patterns, such, for example, as coupling streams that flow transversely of the direction of the ultrasound.

An arrangement utilizing such a transverse flow pattern with separate suction lines for air and liquid is shown in FIG. 9 as including a rigid-walled, bowl-shaped crystal holder 236 and a chambered rail-engaging shoe 240. The holder 236 and the shoe 240 have registering openings in their bottom walls for enabling the coupling liquid to establish direct contact with the rail surface. The holder 236 has a generally horizontal inlet 236I for coupling liquid supplied through line 129 and a generally horizontal outlet 236O for returning coupling liquid through the liquid-suction line 132, and thus the holder 236 provides a flow passage through which coupling liquid flows in a direction generally transverse of the direction of the ultrasonic path therein. The shoe 240 is arranged to define a chamber A that opens towards the rail through an annular ring of holes 242 and communicates with the air-suction line 133 for establishing an air-sweeping action at the surface of the rail that serves to pick up any water that is deposited on the surface of the rail as the apparatus is progressed therealong.

The use of a coupling apparatus having transverse coupling liquid flow has a number of important advantages in that the transverse flow does not affect the phase relationships of the ultrasonic testing apparatus, in that the transverse flow minimizes turbulence and associated "hash" and allows for a more effective sweeping and removal of air bubbles from the ultrasonic path, and in that the transverse flow requires somewhat lower rates of flow.

In the embodiment of FIG. 9, the prewetting film advantageously provides a hydraulic seal around the bottom of the bowl-shaped crystal holder 236 to assist in excluding entry of air to the main couplant stream. Since the flow of coupling liquid out the bottom of the holder 236 is not overly strong, the sealing action of the prewetting film takes on added importance. Once again, the presence of the seal at the rail surface makes it desirable to provide bypass holes H to encourage an increased flow of air into the chamber A to produce a more effective air-sweeping on the rail.

If desired, the rigid-walled, bowl-shaped holder 236 of FIG. 9 may be modified to include a flexible skirt to allow for free rail-following movement of the shoe 240 and of the lower part of the holder 236. Such a modification is believed to be obvious in the light of the showings in FIGS. 7 and 8.

While, at present, for general-purpose rail testing or similar testing operations the use of separate liquid and air-suction lines is very important for effectively removing or minimizing the residual film of liquid referred to hereinbefore, there are certain instances where, due to the ready availability of a plentiful supply of coupling liquid, some loss of coupling liquid can be tolerated. In such instances, a coupling apparatus such as shown in FIG. 10 may be employed. This coupling apparatus is similar to the arrangement of FIG. 7 as respects the dimensions and flow rate of the liquid column in the flow passage P. Thus, the coupling apparatus of FIG. 10 includes a rigid holder tube 136 communicating with a rigid base tube 138' through an intermediate section 139 of flexible tubing such as rubber. The tube 138' extends through a chambered shoe 140' that is provided with a chamber C' in surrounding, communicating relationship with the flow passage P through an annular arrangement of radially extending ports 138R. A sealing ring 150, in the form of a closed loop, is secured around the bottom end of the tube 138' for substantially liquid-tight contact with the surface of the object under test. As shown, this sealing ring 150 may also be bonded to the wear plate of the shoe for stabilizing the relative positioning of the shoe 140' and tube 138', or, as will be apparent, these parts may be secured directly to each other in a manner similar to that of FIG. 8 except that in this latter instance, the parts should be formed to provide an annular mounting recess for the sealing ring.

The sealing ring, as shown, is of solid rubber or other rubber-like material, and it will be apparent that other forms of closed-loop sealing arrangements may be provided around the bottom end of the tube 138'. Where wear conditions permit, a ring of inflated hollow tubing can be employed.

In the arrangement of FIG. 10, the water or other coupling liquid flows in at 136I, down the passage P, through the ports 138R and chamber C', and is returned by suction in line 132. Such leakage as occurs around sealing ring 150 would not be reclaimed, and where greater liquid loss can be tolerated, even a metal-to-metal engagement may be relied upon for sealing.

It will be apparent that a similar type of sealing ring arrangement may be provided for the FIGS. 7, 8 and 9 arrangements.

The presence of the prewetting film finds particular importance when used in conjunction with the coupling apparatus of FIG. 10. The prewetting film in this instance achieves significant improvement in the exclusion of air from the chamber C' and suction line 132, and it permits a reclaiming of substantially all of the coupling liquid circulating through the passage P without, however, inducing undesired air bubbles.

It should be understood that the description of the preferred form of the invention is for the purpose of complying with section 112, title 35, of the U.S. Code and that the claims should be construed as broadly as prior art will permit.

I claim:

1. In a detector car of the type having front and rear wheels adapted to ride along track rails, said car having ultrasonic equipment mounted thereon with said equipment including an emitter of vibrational signals mounted for movement with the car, and said car being movable along said rails for continuously progressing said emitter over longitudinally successive surface portions of one of the rails to establish momentary working relationship between the emitter and successive portions of the rail, a first liquid dispenser carried by the car for continuously maintaining coupling liquid between the emitter and the rail surface portion momentarily in working relationship therewith for transmitting signals therebetween, and a second liquid dispenser carried by the car and disposed adjacent a surface portion of the rail located forwardly of the rail surface portion that is in working relationship with the emitter for continuously applying a film of coupling liquid to such forwardly located surface portion for prewetting the same to improve the signal transmission through the coupling liquid supplied between the emitter and such pre-wet surface portion by the first dispenser as the travel of the car brings the emitter into working relationship with such pre-wet surface portion.

2. The combination with the arrangement of claim 1 of a common liquid storage container mounted on the car and communicating with said first and second liquid dispensers.

3. In a detector car of the type having front and rear wheels adapted to ride along track rails, said car having ultrasonic equipment mounted thereon with said equipment including an emitter of vibrational signals mounted for movement with the car and disposed between the front and rear wheels thereof, and said car being movable along said rails for continuously progressing said emitter over longitudinally successive surface portions of one of the rails to establish momentary working relationship between the emitter and successive portions of the rail when such portions are between the front and rear wheels of the car, a first liquid dispenser carried by said car for continuously maintaining coupling liquid between the emitter and the rail surface portion momentarily in working relationship therewith for transmitting signals therebetween, and a second liquid dispenser carried by said car and disposed adjacent a surface portion of the rail located forwardly of the front wheel of the car for continuously applying a film of coupling liquid to such surface portion for pre-wetting the same to improve the signal transmission through the coupling liquid supplied between the emitter and such surface portion by the first dispenser as the travel of the car brings the emitter into working relationship with such surface portion.

4. In a detector car of the type having front and rear wheels adapted to ride along track rails, said car having ultrasonic equipment mounted thereon with said equipment including an emitter of vibrational signals mounted for movement with the car, and said car being movable along said rails for continuously progressing said emitter over longitudinally successive surface portions of one of the rails to establish momentary working relationship between the emitter and successive portions of the rail: first means carried by the car and continuously dispensing coupling liquid to maintain a solid stream of coupling liquid between the emitter and the rail surface portion momentarily in working relationship therewith for transmitting vibrational signals therebetween, and second means carried by the car for positioning adjacent a rail surface portion located forwardly of the rail surface portion that is in momentary working relationship with the emitter for continuously applying a film of coupling liquid to such forwardly located surface portion for pre-wetting the same to improve the signal transmission through the solid stream of coupling liquid between the emitter and such pre-wet surface portion as the travel of the car brings the emitter into working relationship with such pre-wet surface portion.

5. In a detector car of the type having front and rear wheels adapted to ride along track rails, said car having ultrasonic equipment mounted thereon with said equipment including an emitter of vibrational signals mounted for movement with the car, and said car being movable along said rails for continuously progressing said emitter over longitudinally successive surface portions of one of the rails to establish momentary working relationship between the emitter and successive portions of the rail; coupling apparatus carried by the car and continuously dispensing coupling liquid to maintain a solid stream of coupling liquid between the emitter and a rail surface portion momentarily in working relationship therewith for transmitting vibrational signals therebetween, said apparatus including hollow supporting structure housing said emitter in spaced relation to said rail surface portion to form a flow passage that is bounded in part by said rail surface portion and provides a direct ultrasonic path thereto, wetting means carried by the car for positioning adjacent a rail surface portion located forwardly of the rail surface portion that is in momentary working relationship with the emitter for continuously applying a film of coupling liquid to such forwardly located surface portion for pre-wetting the same to improve the signal transmission through the solid stream of coupling liquid between the emitter and such pre-wet surface portion as the travel of the car brings the emitter into working relationship with such pre-wet surface portion, said film sealing the region between said hollow supporting structure and the rail surface portion threadjacent, and a liquid suction line carried by the car and communicating with said passage to reclaim said coupling liquid for reuse.

6. In a detector car of the type having front and rear wheels adapted to ride along track rails, said car having ultrasonic equipment mounted thereon with said equipment including an emitter of vibrational signals mounted for movement with the car, and said car being movable along said rails for continuously progressing said emitter over longitudinally successive surface portions of one of the rails to establish momentary working relationship between the emitter and successive portions of the rail; coupling apparatus carried by the car and continuously dispensing coupling liquid to maintain a solid stream of coupling liquid between the emitter and a rail surface portion momentarily in working relationship therewith for transmitting vibrational signals therebetween, said apparatus including hollow supporting structure housing said emitter in spaced relation to said rail surface portion to form a flow passage that is bounded in part by said rail surface portion and provides a direct ultrasonic path thereto, said coupling apparatus including wall means forming a chamber surrounding said passage adjacent the region thereof bounded by said rail surface portion, said chamber having inlet openings facing towards said rail surface portion at points spaced about the adjacent end of said flow passage, an air suction line carried by the car and communicating with said chamber, a liquid suction line carried by the car and communicating with said passage, and wetting means carried by the car for positioning adjacent a rail surface portion located forwardly of the rail surface portion that is in momentary working relationship with the emitter for continuously applying a film of coupling liquid to such forwardly located surface portion for pre-wetting the same to improve the signal transmission through the solid stream of coupling liquid between the emitter and such pre-wet surface portion as the travel of the car brings the emitter into working relationship with such pre-wet surface portion, said film sealing the region between said hollow supporting structure and the adjacent rail surface portion.

7. The arrangement of claim 6 wherein said liquid suction line communicates with said flow passage at a point therein adjacent the region thereof that is bounded by said rail surface portion to set up a coupling liquid stream through which elastic vibrations are directed streamwise.

8. The arrangement of claim 6 wherein said liquid suction line communicates with said flow passage at a point therein remote from the region thereof that is bounded by said rail surface portion to set up a coupling liquid stream that flows generally transversely of the direction in which said generator and rail surface portion are spaced apart.

9. In a detector car of the type having front and rear wheels adapted to ride along track rails, said car having ultrasonic equipment mounted thereon with said equipment including an emitter of vibrational signals mounted for movement with the car, and said car being movable along said rails for continuously progressing said emitter over longitudinally successive surface portions of one of the rails to establish momentary working relationship between the emitter and successive portions of the rail; coupling apparatus carried by the car and continuously dispensing coupling liquid to maintain a solid stream of coupling liquid between the emitter and a rail surface portion momentarily in working relationship therewith for transmitting vibrational signals therebetween, said apparatus including hollow supporting structure housing said generator in spaced relation to said rail surface portion and extending to a region adjacent said rail surface portion to form a flow passage that is bounded in part by said rail surface portion and provides a direct ultrasonic path thereto, said coupling apparatus including wall means forming a first chamber surrounding and communicating with said region of the flow passage and a second chamber surrounding said flow passage at the region thereof adjacent said rail surface portion, said second chamber having inlet openings facing towards said rail surface portion at points spaced about the adjacent end of said flow passage, a liquid suction line carried by the car and communicating with said first chamber, an air suction line carried by the car and communicating with said second chamber, and wetting means carried by the car for positioning adjacent a rail surface portion located forwardly of the rail surface portion that is in momentary working relationship with the emitter for continuously applying a film of coupling liquid to such forwardly located surface portion for prewetting the same to improve the signal transmission through the solid stream of coupling liquid between the emitter and such pre-wet surface portion as the travel of the car brings the emitter into working relationship with such pre-wet surface portion, said film sealing the region between said hollow supporting structure and the rail surface portion thereadjacent to prevent air bubbles from entering said passage.

10. In a detector car of the type having front and rear wheels adapted to ride along track rails, said car having ultrasonic equipment mounted thereon with said equipment including an emitter of vibrational signals mounted for movement with the car, and said car being movable along said rails for continuously progressing said emitter over longitudinally successive surface portions of one of the rails to establish momentary working relationship between the emitter and successive portions of the rail; first means carried by the car and continuously dispensing coupling liquid to maintain a solid stream of coupling liquid between the emitter and the rail surface portion momentarily in working relationship therewith for transmitting vibrational signals therebetween, said stream flowing generally transversely of the direction in which said emitter and said rail surface portion are spaced apart, and second means carried by the car for positioning adjacent a rail surface portion located forwardly of the rail surface portion that is in momentary working relationship with the emitter for continuously applying a film of coupling liquid to such forwardly located surface portion for pre-wetting the same to improve the signal transmission through the solid stream of coupling liquid between the emitter and such pre-wet surface portion as the travel of the car brings the emitter into working relationship with such pre-wet surface portion.

11. In combination with a detector car of the type having front and rear wheels adapted to ride along track rails, said car having ultrasonic equipment mounted thereon with said equipment including an emitter of vibrational signals mounted for movement with the car, said car being movable along said rails for continuously progressing said emitter over longitudinally successive surface portions of one of the rails to establish continuously relatively movable coupling contact between said emitter and successive portions of the rail, first means carried by the car in continuous contact with the rail for establishing ultrasonic coupling between the emitter and each successive rail surface portion that is momentarily brought into working relationship therewith by the progressive travel of the car for transmitting vibrational signals therebetween, and liquid-dispensing means carried by the car and disposed adjacent a surface portion of the rail located forwardly of the rail surface portion that is in working relationship with the emitter for applying a film of coupling liquid to such forwardly located surface portion for prewetting the same to improve the signal transmission through the ultrasonic coupling established between the emitter and such pre-wet surface portion by said first means as the travel of the car brings the emitter into working relationship with such pre-wet surface portion.

12. In combination with a detector car of the type having front and rear wheels adapted to ride along track rails, said car having ultrasonic equipment mounted thereon with said equipment including an emitter of vibrational signals mounted for movement with the car, said car being movable along said rails for continuously progressing said emitter over longitudinally successive surface portions of one of the rails to establish continuously relatively movable coupling contact between said emitter and successive portions of the rail, first means carried by the car in continuous contact with the rail for establishing ultrasonic coupling between the emitter and each successive rail surface portion that is momentarily brought into working relationship therewith by the progressive travel of the car for transmitting vibrational signals therebetween, and liquid-dispensing means carried by the car and disposed adjacent a surface portion of the rail located several feet forwardly of the rail surface portion that is in working relationship with the emitter for applying a film of coupling liquid to such forwardly located surface portion for prewetting the same for an interval on the order of two-thirds of a second to improve the signal transmission through the ultrasonic coupling established between the emitter and such prewet surface portion by said first means as the travel of the car brings the emitter into working relationship with such prewet surface portion.

References Cited in the file of this patent
UNITED STATES PATENTS

| | | |
|---|---|---|
| 2,524,208 | Piper | Oct. 3, 1950 |
| 2,532,507 | Meunier | Dec. 5, 1950 |
| 2,672,753 | Drake | Mar. 23, 1954 |
| 2,678,559 | Drake | May 18, 1954 |
| 2,751,783 | Erdman | June 26, 1956 |
| 2,873,391 | Schulze | Feb. 10, 1959 |